(12) United States Patent
Skeoch et al.

(10) Patent No.: US 9,713,084 B2
(45) Date of Patent: Jul. 18, 2017

(54) LOST ACCESS POINT POWER SAVE MODE FOR WIFI DEVICES

(71) Applicant: NETGEAR, INC., San Jose, CA (US)

(72) Inventors: Steve Skeoch, Carlsbad, CA (US); Chris McGill, San Diego, CA (US)

(73) Assignee: NETGEAR, INC., San Jose, CA (US)

( * ) Notice: Subject to any disclaimer, the term of this patent is extended or adjusted under 35 U.S.C. 154(b) by 0 days.

(21) Appl. No.: 14/927,079

(22) Filed: Oct. 29, 2015

(65) Prior Publication Data
US 2017/0127347 A1  May 4, 2017

(51) Int. Cl.
*H04B 1/16* (2006.01)
*H04W 52/02* (2009.01)

(52) U.S. Cl.
CPC .............................. *H04W 52/0203* (2013.01)

(58) Field of Classification Search
CPC .............. H04Q 2209/43; H04W 84/18; H04N 1/00896; H04N 2201/0039; G08B 13/19656; G08B 13/19693; H04M 19/08
USPC ....... 455/3.01, 343.2, 343.5, 344; 348/14.02, 348/211.2; 370/310, 311
See application file for complete search history.

(56) References Cited

U.S. PATENT DOCUMENTS

| | | | | |
|---|---|---|---|---|
| 7,158,803 | B1 * | 1/2007 | Elliott | H04W 72/10 455/404.1 |
| 7,969,912 | B2 * | 6/2011 | Jeon | H04L 12/12 370/254 |
| 8,390,720 | B2 * | 3/2013 | Goldberg | H04N 5/23296 348/14.08 |
| 2006/0014537 | A1 * | 1/2006 | Arai | H04W 48/20 455/435.1 |
| 2008/0291855 | A1 * | 11/2008 | Bata | H04W 84/18 370/311 |
| 2009/0279466 | A1 * | 11/2009 | Ji | H04W 52/0232 370/311 |
| 2014/0177604 | A1 * | 6/2014 | Lee | H04W 52/0212 370/336 |
| 2016/0105847 | A1 * | 4/2016 | Smith | H04L 67/125 370/252 |

* cited by examiner

*Primary Examiner* — Sonny Trinh
(74) *Attorney, Agent, or Firm* — Duane Morris LLP

(57) ABSTRACT

The invention is directed to a wireless communication device that includes: a radio unit configured to provide two-way wireless communications; a host processing unit; and a sleep mode unit, coupled to the host processing unit and the radio unit, configured to control a sleep time of the host processing unit and the radio unit, wherein if the radio unit does not receive a signal from the access point that associates the wireless communication device with the access point, the sleep unit increases the sleep time of the host processing unit and the radio unit after each set of one or more failed attempts by the wireless communication device to associate with the access point.

27 Claims, 7 Drawing Sheets

LOST ACCESS POINT POWER SAVE MODE FOR WIFI DEVICES

FIELD OF THE INVENTION

The invention is related generally to radio-frequency (RF) communication devices and systems and, more particularly, to a method and apparatus for conserving power used by RF devices and systems.

BACKGROUND OF THE INVENTION

RF devices and systems typically include one or more RF transceivers for transmitting and receiving wireless signals. FIGS. 1A and 1B illustrate block diagrams of conventional receiver and transmitter circuits of an RF transceiver, respectively. As shown in FIG. 1A, a RF receiver circuit 100 include a RF front end unit 102, coupled to at least one antenna 104, and a signal processing unit 106 coupled to the RF front end unit 102. The RF front end unit 102 includes an impedance matching circuit 110, a low-noise amplifier (LNA) 112, a mixer 114, a local oscillator 116 and a band-pass filter 118. The impedance matching circuit 110 matches the input impedance of the receiver 100 with the impedance of the antenna so that maximum power of a RF signal received by the antenna 104 is transferred to the LNA 112. A primary function of the LNA 112 is to increase the sensitivity of the receiver 100 by amplifying weak signals without introducing significant noise such that the received signals have higher power than the noise in succeeding stages.

From the LNA 112, the RF signal is provided to a mixer 114, which mixes the RF signal with another RF signal provided by the local oscillator 116, to produce an intermediate frequency (IF) signal or baseband signal. The IF or baseband signal is then provided to the band-pass filter 118, which filters out signals that are outside of a predetermined frequency band. The filtered signal is then provided to the signal processing unit to perform additional protocol processing such as, for example, demodulation, media access control (MAC) functions, error correction, digital-to-analog conversion (if necessary), etc. The signal is then sent to additional processing units (not shown) for further application specific processing and/or storage.

As shown in FIG. 1B, the RF transmitter circuit 150 essentially performs the above signal processing functions in reverse order. The RF transmitter circuit 150 includes the signal processing unit 106 discussed above, coupled to a RF back end unit 152, which is coupled to the antenna 104. In alternative systems, the antenna 104 may be replaced with a separate antenna dedicated for transmission, or multiple selectable antennas that can be dynamically selected based on protocol requirements and/or performance characteristics, as is known in the art (e.g., MIMO antennas). The signal processing unit 106 receives baseband signals from an application processing unit (not shown), such as a CPU, and then performs initial processing on the baseband signal so that it may be transmitted. Such initial processing functions can include analog-to-digital conversion (if necessary), packetizing the resulting digital data in accordance with a predetermined protocol (e.g., WiFi/802.11 standard), modulation of the digital data onto an IF carrier signal, etc.

The IF carrier signal from the signal processing unit 106 then passes through another band-pass filter 162 which filters out strong signals having frequencies outside of a predetermined frequency band. The filtered IF signal is then up-converted to a RF signal by mixer 158, which mixes the IF signal with another IF signal provided by the local oscillator 160 to generate the RF signal, using techniques well-known in the art. The resulting RF signal is then amplified by the power amplifier 156 and then transmitted by antenna 104. The impedance matching circuit 154 matches the output impedance of the RF back end unit 152 with the impedance of the antenna 104.

The foregoing provides a general discussion of some basic components or units typically found in conventional RF transceivers. Those of ordinary skill in the art will recognize that various designs and architectures can be implemented for RF transceivers, and in particular, for RF front end units and RF back end units that include additional components or units or omit some of the components or units discussed above. For example, in some receiver circuits, the RF front end can refer to all the circuitry between the antenna up to and including the mixer stage. It consists of all the components in the receiver that process the signal at the original incoming radio frequency (RF), up to and including the mixer, which converts the RF signal to a lower intermediate frequency (IF) so that the signal from the antenna can be transferred to the rest of the receiver at the more easily handled intermediate frequency.

In many modern integrated receivers, however, particularly those in wireless devices such as cell phones and Wifi receivers, the intermediate frequency is digitized; sampled and converted to a binary digital form, and the rest of the processing, such as IF filtering and demodulation, for example, is done by digital filters and one or more digital signal processors (DSP's), as these digital units are smaller, use less power and provide programmability. In this type of receiver the RF front end would be considered as everything from the antenna to the analog to digital converter (ADC) which digitizes the IF signal (not including the antenna but including the ADC). Alternatively, some receivers digitize the RF signal directly, without down-conversion to an IF, so here the front end may merely be a LNA and a RF filter. Those of skill in the art would readily recognize what portions of a receiver constitute a "RF front end" and what portions of a transmitter constitute a "RF back end," in accordance with various receiver and transmitter designs and architectures, respectively. Generally, as used herein, the term "RF front end" refers to at least a low-noise amplifier (LNA) and may include additional components or units as discussed above, depending on a particular receiver architecture and design. The term "RF back end," as used herein, will generally refer to at least a power amplifier (PA) and may include additional components or units as discussed above, depending on a particular transmitter's architecture and design.

In many RF applications, such as those utilizing battery-powered, wireless devices configured to communicate in accordance with the 802.11 communication standard protocols (aka, "WiFi"), for example, it is desirable to conserve power as much as possible. By decreasing power consumption, the batteries of such devices require less frequent recharging or replacement, which is more convenient and less costly for users of the devices, and provides a more reliable wireless device.

In a typical low-power WiFi application, for example, the WiFi device is configured to go into its lowest power (sleep) mode between Access Point (AP) beacons that contain Delivery Traffic Indication Map (DTIM) information. As known by those of ordinary skill in the art, the amount of time the WiFi device sleeps is controlled by a DTIM setting. For example, if an AP beacon interval is set to be 100 milliseconds (ms) and the DTIM setting is set to 3, then the low power WiFi device wakes up every 300 ms to receive a beacon and check if any traffic is available for it to receive.

During the sleep period in which the WiFi device is in its lowest power mode, the RF front end and RF back end units' receive (Rx) and transmit (Tx) functions, respectively, are both disabled for predetermined periods of time. Even in this sleep mode, however, the RF transceiver, comprising a WiFi signal processing unit and RF front and back end units, as described above, consumes a non-negligible amount of power, which over time will unduly drain a battery pack. As an example, the WiFi signal processing unit may include a WiFi Media Access and Control (MAC) unit and a radio Application Specific Standard Product (ASSP) unit, which are known in the art. Such a WiFI signal processing unit might consume 170 µW, while the RF Power Amplifier (PA) in the RF back end unit and the Low Noise Amplifier (LNA) in the RF front end unit might together consume 54 µW, for example, during sleep mode. Thus, in this example, even during sleep mode (a.k.a., "idle mode"), a conventional low-power WiFi device may still have a total power consumption of 224 µW (excluding any additional power lost due to power supply inefficiencies). This power consumption is a drain on the battery pack of the WiFi device.

In addition to power consumption by the RF transceiver, typical WiFi devices must power on a host processor that controls the RF transceiver and performs necessary network and application processing functions (e.g., functions above the MAC layer) each time the RF transceiver transmits or receives a signal. The powering on of the host processor in this fashion results in significant power consumption by the WiFi device.

Thus, there is a need for a method and system that can provide further reductions in power consumption in low-power RF applications.

SUMMARY OF THE INVENTION

The invention addresses the above and other needs by providing a methods, devices and systems that further decrease power consumption in the low-power wireless devices and systems.

In one embodiment of the invention, a wireless camera system and network is provided, which includes: a plurality of battery-powered, wireless node cameras, each node camera comprising an image sensor for capturing image data, a radio unit for performing wireless communications, at least one processing unit for controlling the image sensor and radio unit, and at least one battery; and an access point configured to communicate wirelessly with each of the node cameras, and further configured to communicate with a control center that communicatively couples the access point to a computer network, wherein the at least one processing unit in each node camera, includes: a host processing unit; and a sleep mode unit coupled to the host processing unit and the radio unit configured to control a sleep time of the host processing unit and the radio unit, wherein if the radio unit does not receive a signal from the access point that associates a respective node camera with the access point after a predetermined number of attempts, the sleep mode unit increases the sleep time of the host processing unit and the radio unit after each set of one or more subsequent failed attempts by the respective node camera to associate with the access point.

In another embodiment, the invention provides a battery-powered, wireless camera that includes: an image sensor for capturing image data; a radio unit for performing wireless communications with at least one external device; at least one battery for supplying power to the wireless camera; and at least one processing unit for controlling the radio unit, wherein the at least one processing unit, includes: a host processing unit; and a sleep mode unit, coupled to the host processing unit and the radio unit, configured to control a sleep time of the host processing unit and the radio unit, wherein if the radio unit does not receive a signal from the access point that associates the wireless camera with the access point after a predetermined number of attempts, the sleep mode unit increases the sleep time of the host processing unit and the radio unit after each set of one or more subsequent failed attempts by the wireless camera to associate with the access point.

In another embodiment, the invention is directed to a wireless communication device, including: a radio unit configured to provide two-way wireless communications; a host processing unit; and a sleep mode unit, coupled to the host processing unit and the radio unit, configured to control a sleep time of the host processing unit and the radio unit, wherein if the radio unit does not receive a signal from the access point that associates the wireless communication device with the access point after a predetermined number of attempts, the sleep mode unit increases the sleep time of the host processing unit and the radio unit after each set of one or more subsequent failed attempts by the wireless communication device to associate with the access point.

In yet a further embodiment, the invention provide a method for associating a wireless communication device with an access point, the method including: if the wireless communication device does not receive a signal from the access point that associates the wireless communication device with the access point after a predetermined number of tries, increasing a sleep time of the wireless communication device after each set of one or more subsequent failed attempts by the wireless communication device to associate with the access point.

BRIEF DESCRIPTION OF THE DRAWINGS

In the following description of exemplary embodiments, reference is made to the following Figures which form a part hereof, and in which it is shown by way of illustration specific embodiments in which the invention may be made and practiced. It is to be understood that other embodiments may be utilized, and design and/or structural changes may be made, without departing from the scope of the invention. The Figures are provided for purposes of illustration only and merely depict exemplary embodiments of the invention to facilitate the reader's understanding of the invention and should not be considered limiting of the breadth, scope, or applicability of the invention. It should be noted that for clarity and ease of illustration these drawings may omit certain features, components or details that are not pertinent to understanding the respective embodiments of the invention depicted, and further, the drawings are not necessarily drawn to scale.

DETAILED DESCRIPTION OF EXEMPLARY EMBODIMENTS OF THE INVENTION

In the following description of exemplary embodiments, reference is made to the accompanying drawings which form a part hereof, and in which is shown by way of illustration of specific exemplary embodiments in which the invention may be practiced. It is to be understood that other embodiments may be utilized and changes may be made without departing from the scope of the invention. Various embodiments of the invention are described below in the context of a battery-powered, WiFi camera network, which is one example of a low-power, wireless communication application. Although various embodiments and features of the invention are described below in the context of a battery-powered, wireless camera network, it will be appreciated by those of ordinary skill in the art that various features and advantages of the invention can be applied to other types of wireless communication devices, systems or networks in which low power operation is desired.

Figure 1A:
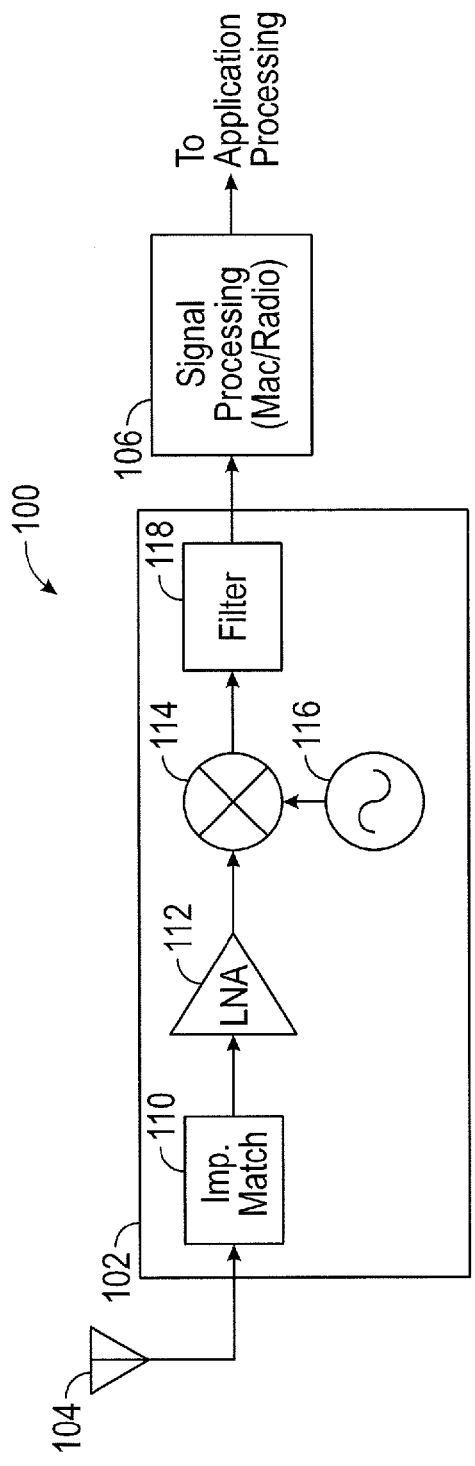
FIG. 1A is a schematic diagram of a conventional RF receiver circuit.
Figure 1B:
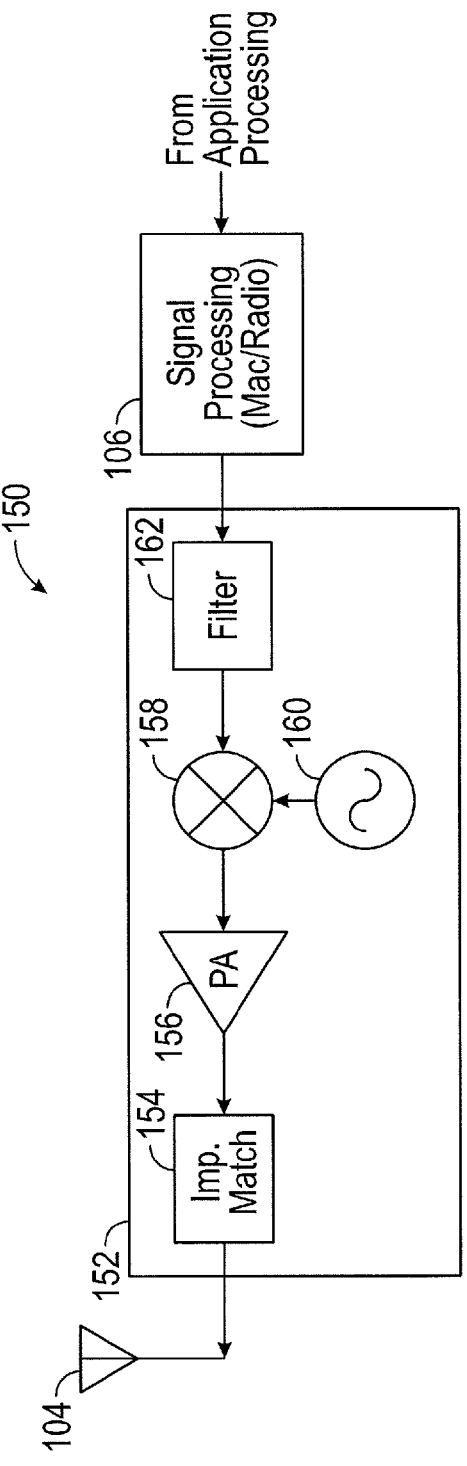
FIG. 1B is a schematic diagram of a conventional RF transmitter circuit.
Figure 2:
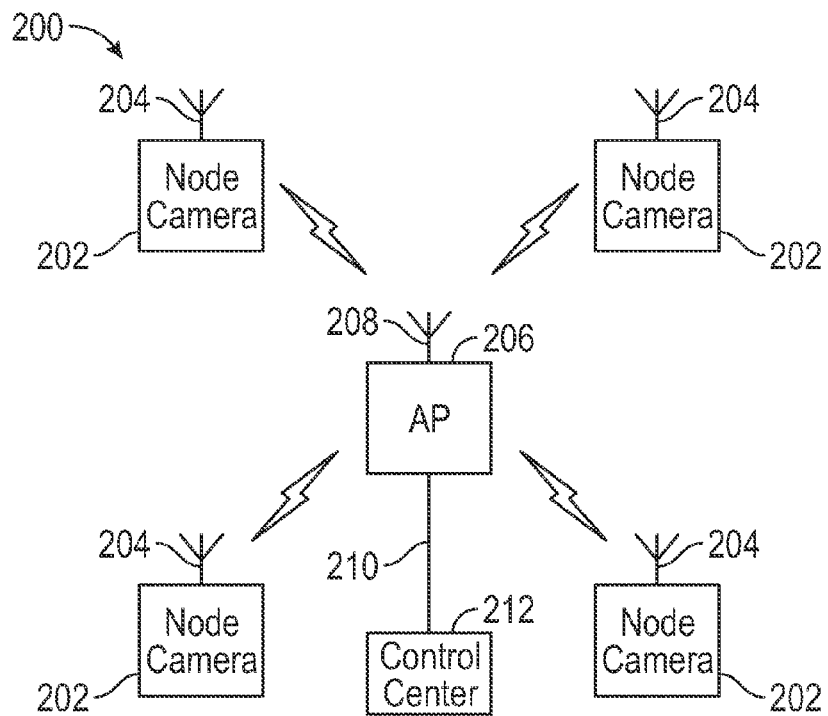
FIG. 2 is block diagram of a wireless camera system, in accordance with one embodiment of the invention.

FIG. 2 illustrates a wireless camera network 200 that includes a plurality of wireless node cameras 202 each having at least one antenna 204 for transmitting and receiving wireless signals to and from a network hub or access point (AP) 206. As shown in FIG. 2, the AP 206 also includes at least one antenna 208 for transmitting and receiving wireless signals to and from one or more of the plurality of wireless node cameras 202. As discussed in further detail below with respect to FIG. 3, each node camera 202 is battery-powered and includes one or more image sensors for capturing still and/or video image data. This image data can then be transmitted wirelessly to AP 206, which can then relay the data to a control center 212 which is communicatively coupled to the AP 206 via a communication link 210.

The communication link 210 may be any wireless or wired communication link suitable for a particular application or network environment that is known in the art. In one exemplary embodiment, the communication link 210 is an Ethernet cable compliant with the IEEE 802.3 standard that communicatively couples the AP 206 with the control center 212.

The control center 212 provides access to data and information stored in the AP 206 to one or more authorized users of the wireless camera system 200. In one embodiment, the control center 212 may be a desktop computer or computer server, for example, that is connected to a larger computer network, e.g., a local area network (LAN), metropolitan area network (MAN) and/or the Internet. Thus, an authorized user having a network-enabled device (e.g., a smartphone or tablet computer) can communicate, through the larger computer network (e.g., Internet), with the control center 212, and hence with the AP 206. In this way, image data transmitted from one or more node cameras 202 to a storage unit in the AP 206 may be accessed via the Internet, for example, by the authorized user's network-enabled device, which stores and executes an application program for communicating with the control center 212 and/or AP 206. In a further embodiment, the control center may include a router (not shown) coupled to the desktop computer or computer server. In this embodiment, the AP 206 is communicatively coupled to the router, which in turn is communicatively coupled to the desktop computer or computer server, using known communication coupling techniques and media.

In one embodiment, the control center 212 may be configured to communicate with more than one AP 206. In a further embodiment, the control center 212 may include a display and an application program for providing an interface for controlling wireless camera system 200, as well as allowing an authorized user to view or analyze images taken from individual node cameras 202. It will be appreciated that control center 212 may include various software, firmware and/or hardware components such as displays, storage equipment, and computer processing equipment, for performing various functions as may be desired for various applications or network environments. In one embodiment, control center 212 may execute automatic processes for evaluating and assessing images received from node cameras 202. For example, the control center 212 may execute image analysis processes for analyzing node camera images for risk assessment, as well as automated communication equipment for initiating and sending communications to an authorized user via the network communication paths discussed herein.

Although four node cameras 202 are shown in FIG. 2, it is understood that more or fewer node cameras 202 may be utilized in any particular application. Furthermore, one or more node cameras 202, in addition to having an image sensor for capturing still and video image data, may include one or more additional sensors for capturing different types of data such as invisible (e.g., infrared) light, acoustic, seismic, spectral, vibration, or other types of information. Alternatively, one or more of the node cameras 202 may be replaced by a different type of sensor node for sensing any other desired physical phenomenon that can be sensed (e.g., infrared light, acoustic, seismic, spectral, vibration, etc.).

In one embodiment, each node camera 202 in the wireless camera system 200 is constructed to be a self-contained, battery-powered, remote imaging device that wirelessly communicates with AP 206. Since each node camera 202 is powered by a battery pack and control unit, which is described in further detail below, it is desirable that each node camera 202 operate in a way that conserves battery power. In this way, the node cameras 202 may be easily installed and distributed within a geographic area, without the need for any power outlets or wires, to wirelessly provide image information to AP 206 without the need for battery recharging or replacement for an extended period of time.

Figure 3:
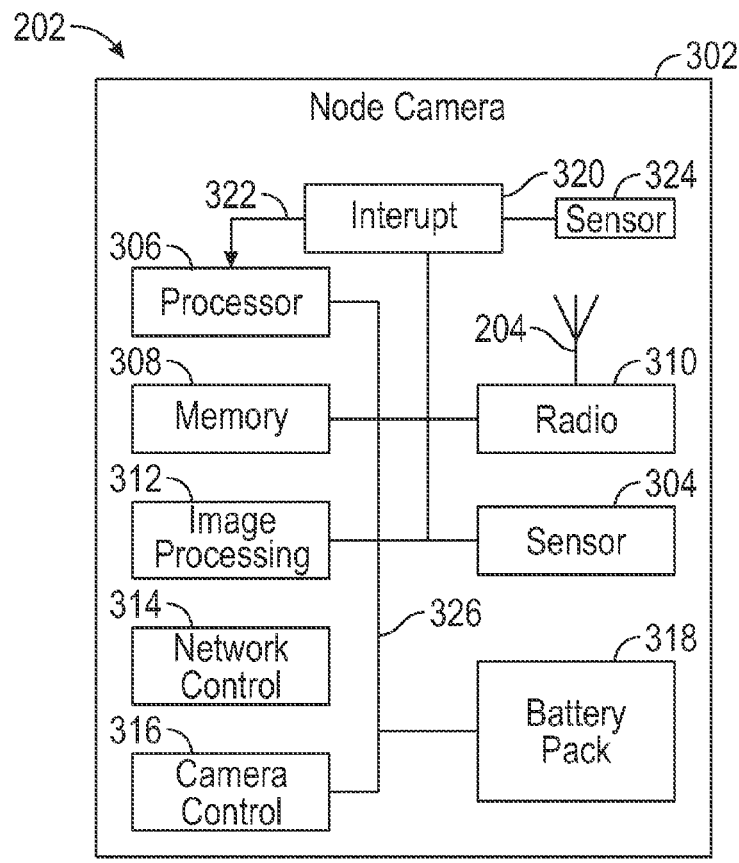
FIG. 3 is a block diagram of a battery-powered wireless camera, in accordance with one embodiment of the invention.

FIG. 3 illustrates a block diagram of a wireless node camera 202, in accordance with one embodiment of the invention. In one embodiment, node camera 202 has a small and compact housing 302 for enclosing and protecting the various camera components illustrated as blocks in FIG. 3. Node camera 202 includes a primary sensor 304 for capturing images (still and/or video) data. As used herein, "image data" refers to still image data, video image data, or both types of data. The sensor 304 may be, for example, a CMOS sensor for reduced power consumption, or may employ CCD imaging technology, and one or more lenses for capturing image data. The sensor may be configured to capture visible wavelength information, or may be set to detect other wavelengths, such as infrared. In an alternative embodiment, the sensor 304 may be a seismic, vibration, audio, spectrometer, or other type of sensor that is known in the art.

Node camera 202 includes at least one processor 306 for providing control and processing capability to perform various functions as described in further detail below. The node camera 202 further includes at least one memory unit 308 for storing image data captured by the sensor 304, as well as storing instructions and/or application programs that are executed by the processor 306 to perform various functions. It is appreciated that the processor 306 can be implemented in accordance with various known technologies. In one embodiment, the processor 306 includes one or more circuits or units configurable to perform one or more data computing procedures or processes. For example, the processor 306 may include one or more processors, controllers, microprocessors, microcontrollers, application specific integrated circuits (ASICs), digital signal processors, programmable logic devices, field programmable gate arrays, or any combination of these devices or structures, or other known devices and structures.

Memory 308 can include one or more various data storage units known in the art such as, for example, non-volatile memory, volatile memory, random-access memory (RAM), dynamic random-access memory (DRAM), static random-access memory (SRAM), non-volatile RAM (flash memory), read-only memory (ROM), programmable read-only memory (PROM), electrically erasable programmable read-only memory (EEPROM), among others. Additionally, although FIG. 3 illustrates memory 308 as being separate from the processing unit 306, in various embodiments, all or part of memory 308 may be provided within one or more integrated circuit packages that make up the processor 306. It is understood that memory 308 can include various types of memories to perform various storage functions required by the processor 306 such as storing instructions and/or application programs to be executed by the processor 306, storing image data captured by sensor 304, providing buffers or registers for information or data to be acted upon by the processor 306, etc. In one embodiment, the memory 308 is formed as a semiconductor device which may or may not be integrated on the same integrated circuit (IC) chip on which the processor 306 is formed.

In one embodiment, the processor 306 executes instructions and/or application programs stored in memory 308 to control various functions of the node camera 202, such as controlling the sensor 304 (e.g., when and for how long images are captured) and/or controlling a radio unit 310 (e.g., in accordance with a communication protocol). In one embodiment, the radio unit 310 includes a transceiver (not shown) for transmitting and receiving signals to and from the AP 206, via their respective antennas 204 and 208, in accordance with the WiFi communication protocol as prescribed by the IEEE 802.11x standards. It is appreciated, however, that the invention can be adapted to perform communications in accordance with any known or to be developed communication protocol, or even a proprietary communication protocol developed for a particular application.

As shown in FIG. 3, in one embodiment, the node camera 202 further includes an image processing unit 312, which may or may not be integrated as part of the processor 306. The image processing unit 312 performs desired processing of image data captured by sensor 304 such as, for example, compressing or encrypting the image data. In one embodiment, the image processing unit 310 applies a JPEG compression algorithm to images captured by sensor 304.

In one embodiment, the node camera 202 further includes a network control unit 314, which may or may not be integrated with the processor 306. The network control unit 314 defines and controls network settings such as how often the node camera 202 attempts to communicate with a hub/AP 206, or settings regarding encryption or compression, for example. Furthermore, network control unit 314 may include a unique ID for node camera 202 that enables the AP 206 to be associated with a particular node camera 202.

In a further embodiment, the node camera 202 further includes a camera control unit 316, which may or may not be integrated as part of the processor 306. The camera control unit 316 may set and control various operating parameters for the sensor 304 such as, for example, resolution, capture windows, timing and sequence of image capture, etc.

It is appreciated that in providing the various functions discussed above, the processor 306 cooperates with memory 308, which provides storage space for images captured by sensor 304, as well as storage space for instructions and/or application programs executed by the processor 306 and/or other units discussed above. In one embodiment, node camera 202 is a wireless camera that is completely powered by a battery pack unit 318, which allows the node camera 202 to be easily installed in any desired location within communication range of the AP 206 without the need for a dedicated external power source (e.g., a power outlet). It is further appreciated that in this configuration, it is desirable to maximize the life of the battery pack unit 318.

In one embodiment, the life of the battery pack 318 is extended by having the node camera 202 normally operate in a "sleep mode," and only activating the node camera for necessary periods of time to perform one or more desired functions. In one exemplary embodiment, the default mode of operation of node camera 202 is a sleep mode wherein the processor 306 and/or one or more units, such as the radio unit 310, for example, are deactivated. In this mode, the processor 306, or any deactivated portion thereof, and one or more deactivated units are only activated on an "as needed" basis. In one embodiment, the node camera 202 includes an interrupt unit 320, which may or may not be integrated with the processor 306. The interrupt unit 320 is configured to generate an interrupt signal 322 that interrupts (e.g., awakes) the processor 306 and/or any other units on a predetermined periodic basis, or a set time based on a low power timer (not shown) that is executed by the interrupt unit 320. In one embodiment, this low power timer draws only approximately 5 to 10 micro amps of power. In alternative embodiments, the interrupt unit 320 can be configured to generate the interrupt signal 322 in response to detection of a triggering event (e.g., motion or audio detection) as may be detected by secondary sensor 324, which is discussed in further detail below.

In one embodiment, when the interrupt unit 320 generates the interrupt signal 322, both the processor 306 and the radio unit 310 are activated. After activation in this fashion, the node camera 202 acts according to its defined network controls as set by network control unit 314 and its defined camera controls as set by camera control unit 316. In one embodiment, when the node camera 202 first wakes up, it generates a request signal which is then transmitted by radio unit 310 via antenna 204. After the request signal has been transmitted, the radio unit 310 enters a listen mode for a defined short period of time. For example, this listen mode time period may be in the range of 20 to 50 milliseconds (ms). During this listen mode period, the radio unit 310 waits to receive an acknowledgment signal from the control hub/AP 206. If no acknowledgment signal is received during the listen mode period, the node camera 202 goes back to sleep until another interrupt signal 322 is generated.

If the hub/AP 206 does respond, then a communication link is established between the node camera 202 and the AP 206. The AP 206 may then command the node camera 202 to take additional action(s). These actions could include, for example, capturing an image, transmitting a stored image, transmitting status information, re-entering a sleep mode, etc. It is appreciated that the node camera power requirements increase dramatically while radio unit 310 and processor unit 306 are operating. In one embodiment, the radio unit 310 and processor 306 operate for only a short period of time, so the overall drain is not substantial. The overall life of the battery pack unit 318 is affected by how often the interrupt unit 320 causes the node camera 202 to wake up.

In one embodiment, the node camera 202 may include a secondary sensor 324 that can also be used to generate an interrupt signal. For example, secondary sensor 324 could be a microphone which generates an interrupt signal upon receiving an audio signal above a defined threshold. Alternatively, the secondary sensor 324 may be a motion sensor for sensing motion in a room, for example. Such secondary sensors 324 may be useful, for example, in security situations to detect if an unauthorized entry into a particular area has occurred. Upon detecting a substantial noise and/or motion, an interrupt signal 322 is generated, which then activates processor 306 and radio unit 310, as discussed above. The camera control unit 316 may be set such that if the secondary sensor 324 activates the processor 306 and/or radio 310, then the primary sensor 304 begins to immediately capture image data. It is appreciated that secondary sensor 324 may be any desired sensor known in the art, either now or in the future, to detect a physical phenomenon in accordance with a particular application or function. For example, the secondary sensor 324 may be a temperature sensor, an image sensor, or a vibration sensor, etc. In one embodiment, primary sensor 304 and secondary sensor 324 may be two different windows on the same CMOS image sensor.

Figure 4:
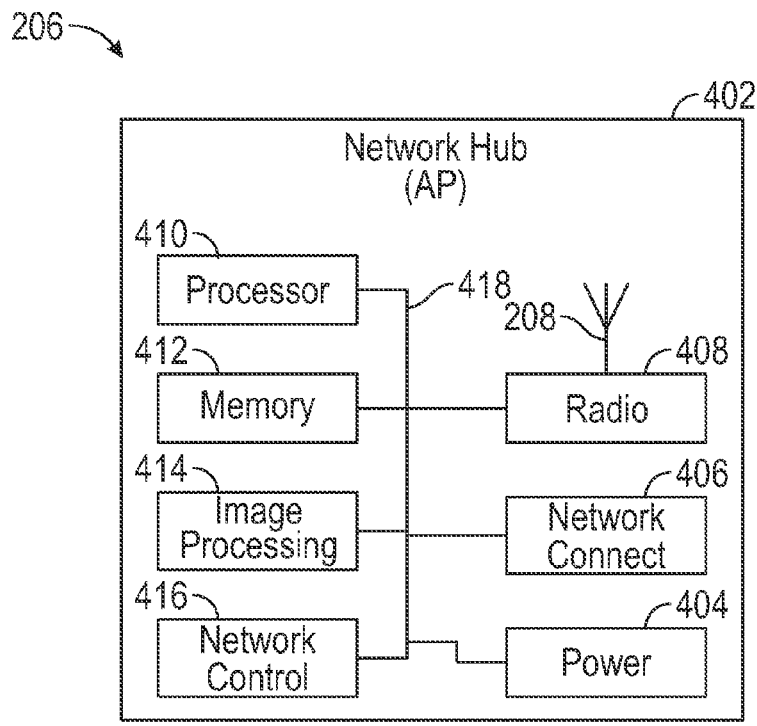
FIG. 4 is a block diagram of an access point (AP) that functions as a communication hub for one or more wireless cameras as shown in FIG. 3, in accordance with one embodiment of the invention.

FIG. 4 is a block diagram of an AP 206 (aka, "network hub"), in accordance with one embodiment of the invention. The AP 206 wirelessly communicates with, and controls access to the plurality of node cameras 202 by an authorized user of the wireless camera network 200 of FIG. 2. The AP 206 includes a housing 402 for containing all the component blocks or units illustrated in FIG. 4. In one embodiment, the AP 206 is configured to be installed in an area that has direct access to an enduring power source, such as a wall outlet. Alternatively or additionally, the AP 206 may include a secondary power source 404, which may include one or more primary (i.e., non-rechargeable) or secondary (i.e., rechargeable) batteries.

The AP 206 includes a network connection unit 406, that is configured to provide a communication interface between a larger computer network, such as the Internet, for example, and the wireless camera system 200. In one embodiment, numerous AP's 206 may be communicatively coupled to a central control center 212 to provide a larger wireless camera network consisting of a plurality of smaller wireless camera networks 200, as shown in FIG. 2. In this way, an authorized user can access data from a greater number of node cameras 202 distributed across a larger geographic area or more numerous locations within a building or campus, for example.

The AP 206 also includes a radio unit 408 coupled to antenna 208 for transmitting and receiving signals to and from the plurality of node cameras 202. In one embodiment, the radio unit 408 and antenna 208 are constructed and configured to facilitate two-way wireless communication with the plurality of node cameras 202 in accordance with the 802.11 communication standard protocols (aka, "WiFi"). The AP 206 also includes a processor 410 which operates in conjunction with memory 412 for various functions. The processor 410 can be implemented in accordance with various known technologies. In one embodiment, the processor 410 includes one or more circuits or units configurable to perform one or more data computing procedures or processes. For example, the processor 410 may include one or more processors, controllers, microprocessors, microcontrollers, application specific integrated circuits (ASICs), digital signal processors, programmable logic devices, field programmable gate arrays, or any combination of these devices or structures, or other known devices and structures. Such devices and structures may be included in one or more integrated circuit packages or chips.

In one embodiment, the radio unit 408 includes appropriate structures known in the art such as a communication interface that provides for or otherwise supports wireless communication with one or more wireless devices such as node cameras 202. The communication interface may further support communication with a computer network such as the Internet, and include a network interface device or card, a modem, a router, a switch, and/or other known structures for performing the communication functions described herein.

Memory 412 can include one or more various data storage units known in the art such as, for example, non-volatile memory, volatile memory, random-access memory (RAM), dynamic random-access memory (DRAM), static random-access memory (SRAM), non-volatile RAM (flash memory), read-only memory (ROM), programmable read-only memory (PROM), electrically erasable programmable read-only memory (EEPROM), among others. Additionally, although FIG. 4 illustrates memory 412 as being separate from the processing unit 410, in various embodiments, all or part of memory 412 may be provided within one or more integrated circuit packages that make up the processor 410. It is understood that memory 412 can include various types of memories to perform various storage functions required by the processor 410 such as storing instructions and/or application programs to be executed by the processor 410, storing image data transmitted by a node camera 202, providing buffers or registers for information or data to be acted upon by the processor 410, etc. In one embodiment, the memory 412 is formed as a semiconductor device which may or may not be integrated on the same integrated circuit (IC) chip on which the processor 410 is formed. In one embodiment, the processor 410 executes instructions and/or application programs stored in memory 412 to control various functions of AP 206, such as when and how it communicates with one or more node cameras 202.

As shown in FIG. 4, in one embodiment, the AP 206 further includes an image processing unit 414, which may or may not be integrated as part of the processor 410. The image processing unit 414 can perform desired processing of image data captured and then transmitted by a node camera 202 such as, for example, compressing or encrypting the image data. In one embodiment, since the AP 206 is powered by an enduring power source (e.g., power outlet), some or all of the image processing, which consumes relatively large amounts of power, may be performed by the AP 206 instead of the node camera 202. Also, it is not necessary that the AP 206 be operated in a default sleep mode, although this is not precluded. It will be appreciated that, depending upon application specifics and any energy conservation goals, the radio unit 408 and/or processor 410 of the AP 206 may be operated in a sleep mode for periods of time to conserve energy.

In one embodiment, the AP 206 includes a network management unit 416, which may or may not be integrated with the processor 410. The network management unit 416 defines and controls network settings such as how the AP 206 communicates with the plurality of node cameras 202 and the control center 212, and the protocols used for such communications. In some embodiments, the network management unit 416 serves as a proxy for the node cameras 202 and handles common network protocol traffic (e.g., DHCP signals).

In the wireless node camera 202 described above, it will be appreciated that conserving the power of the battery pack 318 and avoiding undue power drainage of the battery pack 318 is highly desirable. By conserving power and avoiding undue power drainage, the battery packs of the node cameras 202 require less frequent recharging and/or replacement, which is not only more convenient but also less expensive for the user. Furthermore, because the battery pack 318 will last longer, a more reliable wireless camera system/network 200 is provided.

Figure 5:
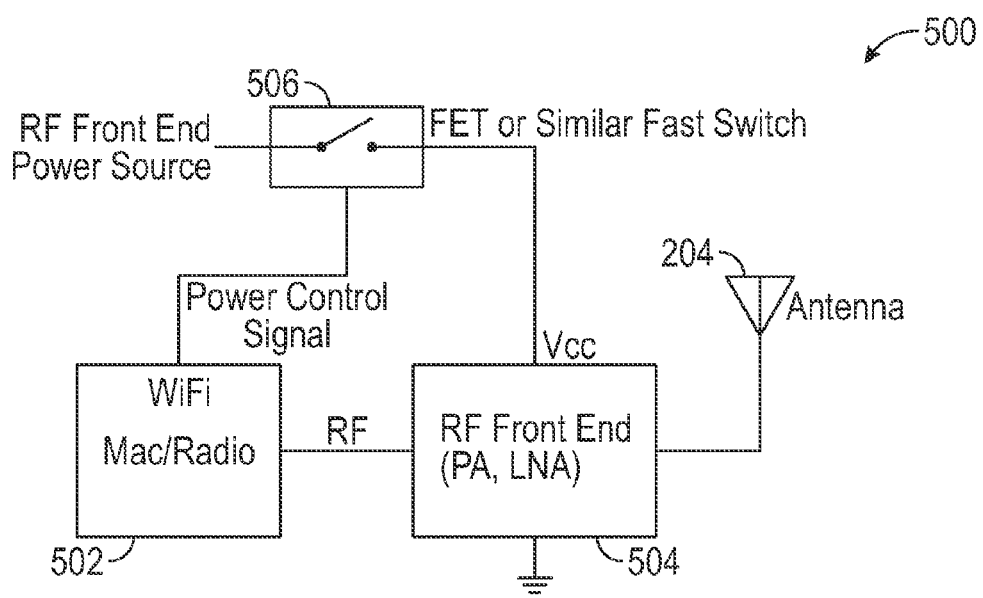
FIG. 5 is a circuit schematic of a RF unit having RF front end power control, in accordance with an exemplary embodiment of the invention.

In order to achieve further power conservation in each node camera 202, the RF front end unit as well as the RF back end of the RF radio unit 310 (FIG. 3) can be completely powered down for durations of time when it is not needed (e.g., between DTIM intervals). FIG. 5 illustrates a schematic block diagram of at least some of the units of a WiFi receiver 500 that can be contained in the radio unit 310 to achieve further power conservation, in accordance with one exemplary embodiment of the invention. As shown in FIG. 5, the WiFi receiver 500 includes a WiFi control unit 502, which includes a media access control (MAC) unit and Radio ASSP unit, for performing MAC control functions (e.g., addressing, channel access control, etc.) and radio processing functions (e.g., modulation, demodulation, packetization, encryption/decryption, error correction, etc.) that are well-known in the art.

The WiFi receiver 500 further includes a RF front end unit 504 that includes at least a LNA, but may include additional components and units depending on the receiver design and architecture, as discussed above. For ease of discussion, the invention will be described in connection with the RF front end unit and, in particular, completely powering down the RF front end unit in order to further conserve power. However, in various embodiments, one or more components or units (e.g., a power amplifier) of the RF unit's back end unit (not shown in FIGS. 5-7) may also be completely powered down simultaneous and in conjunction with the RF front end unit 504. It is appreciated that additional components or units that are not part of the RF front end unit 504 may be completely powered down, in addition to the components and units of the RF front end unit 504 to achieve additional power savings.

As shown in FIG. 5, the RF front end unit 504 is coupled to the WiFi control unit 502 to provide a signal (e.g., a RF, IF or baseband signal) to the WiFi control unit 502 for further processing, as discussed above. The RF front end unit 504 is also electrically grounded to an electrical ground of the node camera 202, and also coupled to antenna 204 to receive signals captured by the antenna 204, as discussed above.

The WiFi receiver 500 further includes an electrically controlled switch 506 having a first pole connected to a power source (e.g., battery pack 318). The switch 506 further includes a second pole connected to a power pin or node (Vcc) of the RF front end unit 504. The switch 506 is controlled by a power control signal generated by the WiFi control unit 502, which opens or closes the switch 506 to disconnect or connect, respectively, the first and second poles of the switch 506. When the switch 506 is closed, the first and second poles are electrically connected to deliver power from the power source (not shown) to the power node (Vcc) of the RF front end unit. When the switch 506 is open, the first and second poles are electrically disconnected from each other and no power is delivered to the RF front end unit 504, thereby completely powering down the front end unit 504. In one embodiment, the switch 506 is provided by a metal oxide semiconductor field effect transistor (MOSFET), and the power control signal is coupled to a gate of the MOSFET, and the first and second poles are provided by the source and drain of the MOSFET, respectively. In alternative embodiments, various types of electrically controlled switches known in the art may be utilized to provide switch 506 depending on system and/or application requirements.

The WiFi control unit 502 generates the power control signal at predetermined time intervals. In one embodiment, the WiFi unit includes a programmable timer unit (not shown) contained within the MAC chip that provides the timing signals to generate the power control signal at the predetermined time intervals when the WiFi control unit 502 is in low power mode (i.e., sleep mode). During this time the RF front end unit 504 is powered down completely only to be periodically powered on when the power control signal closes the switch 504, as described above. In one embodiment, the WiFi control unit 502 generates the power control signal in accordance with a Delivery Traffic Indication Map (DTIM) period setting. As known in the art, the DTIM informs node devices about the presence of buffered multicast/broadcast data at an access point that is associated with the node devices. The DTIM is periodically contained beacons, which are packets periodically sent by an AP to its node devices to synchronize a wireless network. The DTIM period defines how often the DTIM will be included in beacons transmitted by an AP (e.g., every beacon, every other beacon, once every three beacons, etc.).

The 802.11 standards, for example, define a power-save mode for client or node devices. In power-save mode, a client/node device may choose to sleep for one or more beacon intervals waking for beacon frames that include DTIMs. When the DTIM period setting is 2, for example, a client/node device in power-save mode will awaken to receive every other beacon frame. Upon entering power-save mode, a client/node device will transmit a notification to the access point, so that the access point will know how to handle unicast traffic destined for the client/node device. Thus, the client/node device sleeps according to the DTIM period. The higher the DTIM period, the longer a client device may sleep, resulting in additional power savings.

As discussed above, however, even in sleep mode, the RF unit in a client/node device (e.g., node camera 202) consumes a non-negligible amount of power that continues to drain a battery pack of the client/node device. Thus, in one embodiment, in order to further conserve power, the RF front end unit 504 is completely powered down during the majority of a DTIM period and then powered up a predetermined amount of time before the end of the DTIM period. The predetermined amount of time should ensure that the RF front end unit is powered up and allowed to stabilize so that it is ready to receive the AP beacon containing a DTIM. The amount of time needed to power up and stabilize the power rails of the RF front end unit 504 such that it is ready for beacon reception is a function of the power supply architecture and RF front end components, and can be determined and adjusted as desired for a particular application and/or system requirements. After the beacon containing the DTIM is received, after any necessary actions are taken by the node camera 202, the WiFi control unit 502 goes back to sleep, and the RF front end unit 504 is again completely powered down. In the example of a conventional WiFi device presented above, by completely powering down the RF front end during sleep mode, 54 uW typically drawn by the LNA during standby is saved, which results in an additional 24% power savings when compared to conventional sleep mode power savings. Additionally, if, for example, a power supply (e.g., DC-DC converter) of the RF Front End unit 504 also draws 63 uW as its quiescent operating power, by completely disabling the power supply, then the total power savings would be 117 uW.

As discussed above, the power control signal controls the power delivery to the RF front end unit 504, in accordance with various embodiments of the invention. The power control signal must power up the RF front end unit 504 and allow its power rails (i.e., Vcc and ground) to become stable before a beacon is received, and then shut off the power to the RF front end unit when it is no longer being used. In one embodiment, as shown in FIG. 5, the power control signal is generated directly by the WiFi control unit 502 via a signal pin (not shown) at predetermined times, which occur at a predetermined amount of time before the end of a predetermined interval (e.g., DTIM interval). In one embodiment, these predetermined times and intervals are stored within a memory (not shown) and counted by a timer unit (not shown) contained within the WiFi control unit 502. In one embodiment, the WiFi control unit 502 is an integrated circuit (IC) chip.

Figure 6:
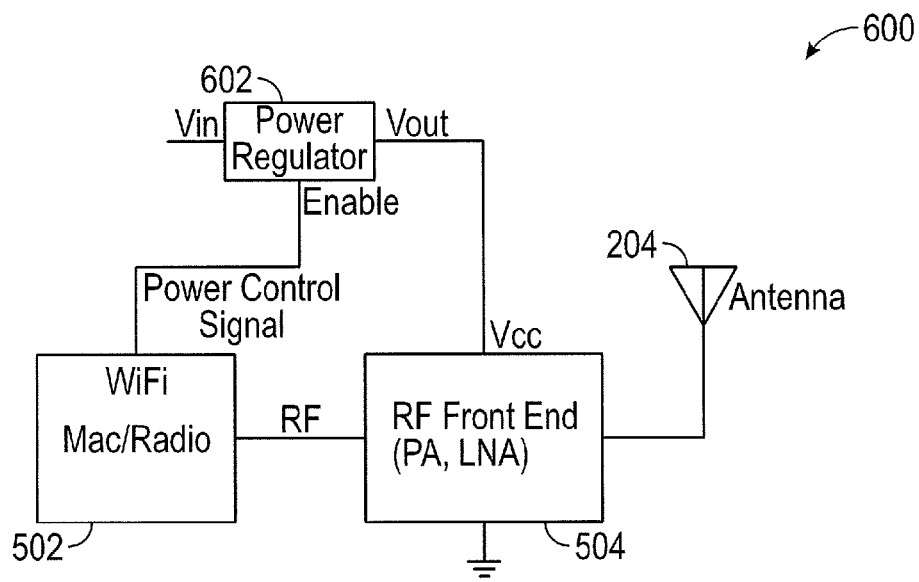
FIG. 6 is a circuit schematic of a RF unit having RF front end power control, in accordance with another exemplary embodiment of the invention.

FIG. 6 illustrates a schematic block diagram of a WiFi receiver 600 that can be utilized within the radio unit 310 (FIG. 3), in accordance with another embodiment of the invention. The WiFi receiver 600 includes the WiFi control unit 502, RF front end unit 504 and antenna 204, as discussed above with respect to FIG. 5, however, the switch 506 is replaced with a power regulator 602, which provides a regulated power to the front end unit 504 when the power regulator 602 is enabled by the power control signal provided by the WiFi unit 504. The power regulator 602 includes a first terminal (Vin) for receiving power from another power source (e.g., battery pack 318), a second terminal (Vout) for supplying power to the power terminal or rail (Vcc) of the RF front end unit 504, and a third terminal for receiving the power control signal from the WiFi control unit 502. The power regulator 602 can be made in accordance with various known power regulator designs and architectures to provide a stable, regulated power source for the RF front end unit 504, in accordance with various embodiments of the invention. In one embodiment, when the power regulator 602 is disabled by the power control signal, no power is delivered to the RF front end unit 502 (i.e., it is completely turned off).

Figure 7:
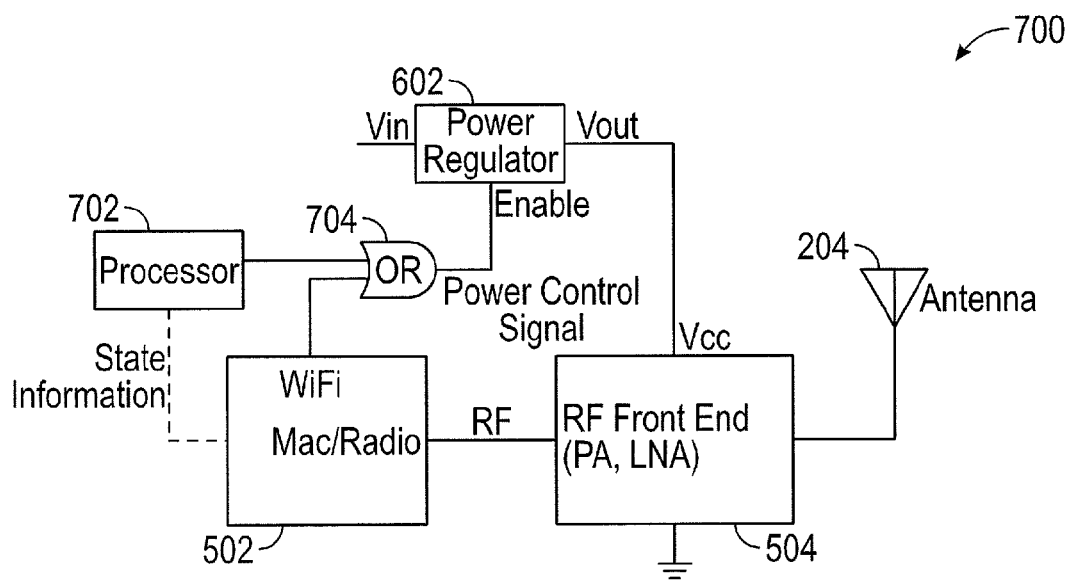
FIG. 7 is a circuit schematic of a RF unit having RF front end power control, in accordance with yet another exemplary embodiment of the invention.

FIG. 7 illustrates a schematic block diagram of a WiFi receiver 700 that can be utilized within the radio unit 310 (FIG. 3), in accordance with another embodiment of the invention. The WiFi receiver 700 includes the WiFi control unit 502, RF front end unit 504, antenna 204 and power regulator 602, as discussed above with respect to FIG. 6, however, further includes a processor unit 702 and an OR gate 704 for providing additional logic functions for generating the power control signal that enables or disables the power regulator 602. In various embodiments, the processor 702 may be a secondary processor located within the radio unit 310 (FIG. 3), or integrated within the WiFi control unit 502, or integrated as part of the processor 306 (FIG. 3).

The OR gate 704 includes a first input coupled to an output of the processor 702 and a second input coupled to a control signal output ("WiFi Front End Active") of the WiFi control unit 502. If either input is "active" (e.g., logical "true") then the output of the OR gate 704 will also be "active" to enable the power regulator 602. It is appreciated that various conditions can lead to either the output of the processor 702 or the output of the WiFi unit 602 being true, or both outputs being true.

In one embodiment, the WiFi control unit 502 generates an enable signal at predetermined times (e.g., just before the end of a DTIM interval), as discussed above. Additionally, an enable signal can be generated by the processor 702 to power up the RF front end unit 504 under various conditions or triggering events (e.g., occurrence of an external event, or other predetermined condition). In one embodiment, the processor 702 is aware of both the state of WiFi control unit 502 (sleeping or active) and when the RF front end unit 504 is active by monitoring a signal ("State Information") from the WiFi control unit 502. If the processor 702 determines that the WiFi control unit 502 is in a sleep state, and is also aware of the WiFi sleep interval (e.g., through monitoring the ASSP signal activity), the processor 702 generates and provides an "active" (i.e., enable) signal to the first input of the OR gate 704, which in turn will output the power control signal to enable the power regulator 602 to provide power to the RF front end unit 504. The processor 702 generates the "active" signal that enables the power control signal at a predetermined time in anticipation of an AP beacon reception, and maintains its "active" output for as long as the WiFi control unit 502 is using the RF front end unit 504.

Figure 8:
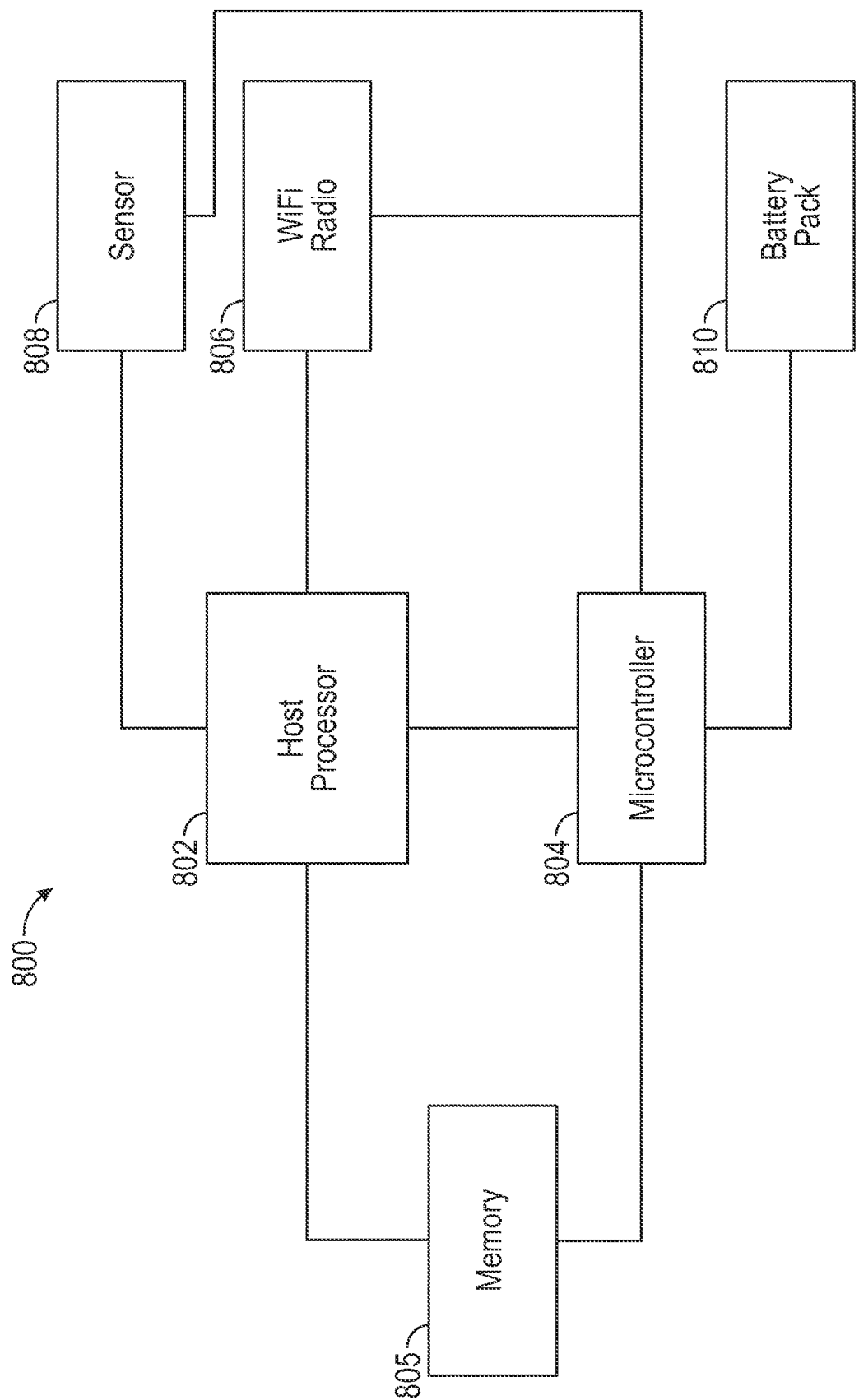
FIG. 8 illustrates a block diagram of a wireless node camera, in accordance with one embodiment of the invention.

FIG. 8 illustrates a block diagram of some of the units contained within a wireless node camera 800 configured to conserve battery power, in accordance with another embodiment of the invention. It is appreciated that for ease of discussion, all of the components and/or units of the node camera 800 are not necessarily illustrated in FIG. 8. The node camera 800 includes a host processor 802, a microcontroller 804 coupled to the host processor 802, a memory 805 coupled to the host processor 802 and microcontroller 804, a WiFi radio unit 806 coupled to the host processor 802 and microcontroller 804, a sensor 808 coupled to the host processor 802 and microcontroller 804, and a battery pack 810 coupled to at least the microcontroller 804. The sensor 808 may the same as sensor 304 discussed above with respect to FIG. 3 and, therefore, need not be discussed in further detail here. Similarly, the battery pack 810 may be the same as battery pack 318 discussed above with respect to FIG. 3. The WiFi radio unit 806 may be the same as the radio unit 310 discussed above but, in accordance with one embodiment, is configured to provide two-way wireless communications in accordance with the 802.11x standards (a.k.a., the WiFi standards).

In one embodiment, the host processor 802 together with the microcontroller 804 are configured to perform all of the functions of the processor 306 and associated units discussed above with respect to FIG. 3. Additionally, in accordance with one embodiment, the host processor 802 is a separate discrete unit from microcontroller 804 such that they can be powered on and off, and enter and exit sleep modes, independently of one another.

In one embodiment, the microcontroller 804 controls most or all of the simple hardware components in the node camera 800 such as, for example, LED's, secondary sensors, voltage regulators, etc. Additionally, the microcontroller 804 controls operation of the node camera 800 when the host processor 802 is powered down and powers up the host processor 802 upon the occurrence of one or more predetermined triggering events, as described in further detail below. The host processor 802, when awake, is the master controller of the node camera 800 and functions as the host processor to the WiFi radio unit 806 and the primary sensor 808. In one embodiment, the primary sensor 808 includes an imaging unit coupled to one or more lenses for capturing image data. In this embodiment, the host processor 802 performs image processing functions on image data received from the sensor 808, and also controls handling of WiFi messages received from and transmitted to the AP 206. When there are no messages to be received or transmitted, and no image processing functions to be performed, however, the host processor 802 can be powered down or placed in a low-power sleep mode.

In one embodiment, the WiFi radio unit 806 is a 802.11 (a), (b) and (g) compliant transceiver and uses the WiFi Protected Setup (WPS) security standard to associate with the AP 206. In a further embodiment, the microcontroller 804 further controls the power ON/OFF and/or sleep mode ON/OFF of the WiFi radio unit 806. Additionally, the microcontroller 804 can be further configured to control the power ON/OFF and/or sleep mode ON/OFF of the sensor unit 808, in accordance with another embodiment of the invention. In various embodiments, the memory 805, or portions thereof, may be contained within the same IC chip as the microcontroller 804 and/or the host processor 802.

After initial power ON, the node camera 800 will attempt to associate with one or more AP's 206 by searching for a predefined service set identifier (SSID) transmitted by the AP 206. Once associated with one or more predetermined AP's 206, the node camera 806 will transition to an idle state. In this idle state, the node camera 800 is in a low power state where all non-essential components or units are powered down or in sleep mode in order to conserve power. In one embodiment, the host processor 802 and the WiFi radio unit 806 are placed in sleep mode, to be awakened by the microcontroller 804 upon the occurrence of a predetermined triggering event. In sleep mode, information pertaining to the last state of the host processor 802 and/or the WiFi radio unit 806 may be stored in memory 805, as necessary, so that when the host processor 804 and/or WiFi radio unit 806 are awakened, they may resume operations from their last state before they entered the sleep mode.

In one embodiment, in the idle state, the node camera 800 only periodically listens for beacons from one or more AP's 206. In one embodiment, it will skip a predetermined number (X) of beacons then attempt to capture the next beacon. Contained in the beacon is a Traffic Indication Map (TIM) or a Delivery Traffic Indication Map (DTIM), which contain information indicating whether information or a message is waiting to be sent to the node camera 800. If the TIM or DTIM indicates that the node camera 800 has a message waiting to be sent to the node camera 800, this will trigger the microcontroller 804 to wake up the host processor 802, which will then execute a process to request the message or data from the AP 206. Upon receiving the message, the host processor 802 will process any instructions or data contained in the message and, thereafter, the node camera 800 will return to the idle state with the host processor 802 and other non-essential units powered down or in a sleep mode.

In one embodiment, in order to minimize power consumption, the node camera 800 will try to stay associated with the AP 206, shutdown any unnecessary devices, and put the necessary devices in low power states. In one embodiment, the host processor 802, its external RAM, and the primary sensor 808 are devices that are completely shut down when the camera 800 is associated with the AP 206 but in idle mode. In this state, the microcontroller 804 and the WiFi radio unit 806 are placed in low-power modes. This shut down of devices presents some challenges, however, because when the host processor 802 shuts down it will not remember what state it was in when it wakes up again unless that state information is saved.

In one embodiment, the microcontroller 804 serves as an external RAM storage device. The host processor 802 stores information in 'virtual registers' located in the microcontroller's random access memory (RAM) (not shown). These 'virtual registers' can be reset to default values on boot up. As long as the microcontroller is powered ON, however, it can save any values that need to be persistent between states when the host processor 804 is powered down. In one embodiment, the host processor 802 is responsible for saving its state values in the microcontroller 805 RAM before the host processor 802 issues a "HIBERNATE" command to the microcontroller 804. This command tells the microcontroller 804 that the host processor 802 has completed all necessary operations and is ready to be powered down.

In one embodiment, the host processor 802 is also responsible for setting the WiFi radio unit 806 into its low-power mode. In various embodiments, various power modes can be predefined and implemented by microcontroller to control the powering on and off of the host processor 802 and any other system devices for predetermined periods of time and durations of time. For example, in an "Active" power mode (Active state), the host processor and all other system devices are fully turned on. In a first low power mode (LPM1), the host processor is turned off but all peripherals (e.g., Wifi unit) are turned on. In a second low-power mode (LPM2), all devices are turned off except a clock crystal for time-keeping purposes. It is understood that various low power modes and protocols can be implemented as desired for a particular application or protocol.

In one embodiment, the microcontroller 802 includes a state machine implemented in firmware and/or software stored in a memory of the microcontroller 802. The state machine automatically puts the microcontroller 804 in a low power state when it is not executing a command from the host processor 802 or responding to an interrupt. Therefore, the microcontroller 804 does not need to be told to go to a low power mode by the host processor 802. In one embodiment, the microcontroller 804 controls the voltage regulators (not shown) of the node camera system and turns ON and OFF high power devices or units such as the host processor 802 and the WiFi radio unit 806. In one embodiment, the WiFi radio unit 806 can always be powered ON unless the microcontroller 804 reads a battery voltage too low for the WiFi radio unit 806 to operate. The host processor 802 can be active or powered down (e.g., in sleep mode) depending on the state. The microcontroller 804 is aware of whether the host processor 802 is in an active state or powered down in sleep mode.

If an event occurs that requires the host processor's attention and the host processor 802 is already powered up, then the microcontroller 804 will just inform the host processor 802 of an interrupt. If the host processor 802 is powered down in sleep mode when the event occurs, the microcontroller 804 will first power up the host processor 802 and then inform it of the interrupt.

If the host processor 802 is awakened from a sleep state, it will request its previous state information from the microcontroller 804 and the host processor 802 will transition once again to this previous state. In one embodiment, at the beginning of each state, an interrupt handler (e.g., interrupt unit 320) is called. The microcontroller will have performed the following two operations before powering up the host processor 802: (1) set a flag in a pending interrupt (PEND_IRQ) virtual register and (2) pulled a port pin on the microcontroller chip 804 high indicating a new interrupt is pending. In one embodiment, the interrupt handler is implemented as part of a state machine in the microcontroller 804. Upon detecting that a port pin is high, this state machine causes the host processor 802 to request access to the PEND_IRQ virtual register. The flags in this register indicate what events happened while the host processor 802 was OFF and allows the host processor 802 to take appropriate action.

When the host processor 802 has completed all of its operations it will again power down and enter sleep mode, in accordance with one embodiment. Before powering down, the host processor 802 saves its current state information, and any other desired information, in the memory 805 and/or a memory within the microcontroller 804. The host processor 802 will then send a HIBERNATE command to the microcontroller 804. In response to the HIBERNATE command, the microcontroller 804 powers down the host processor 802.

In some states, such as the Idle state, there will be connections to the AP 206 that have been established. In one embodiment, information about these connections are stored in memory 805 before a power down of the host processor 802 and/or WiFi radio unit 806, and then recovered upon returning to the Idle state from the powered down state. Examples of information that is stored and then recovered are dynamic host configuration protocol (DHCP) information, transmission control protocol (TCP) connection information, WiFi radio unit 806 driver information.

After the WiFi radio unit 806 has associated with an AP 206 it can be placed in a low power mode. In one embodiment, the host processor 802 will initiate a command to place the WiFi radio unit 806 into a low-power mode. In response to the command, the microcontroller 804 will disable power to the Wifi unit 806, in accordance with one embodiment of the invention. In one embodiment, the host processor 802 will initiate the command when the node camera 800 is in idle mode and the host processor 802 is about to initiate the HIBERNATE command to the microcontroller 804, as discussed above. In one embodiment, one of a plurality of power modes can be selected by setting a JSON register (e.g., WifiIdlePM).

In one embodiment, before entering into a low-power mode, the WiFi radio unit 806 sends a message or signal to the AP 206 to inform the AP 206 that the node camera 800 is entering a low-power mode and will not immediately respond to any messages. Therefore, the AP 206 needs to buffer any data that is intended for the node camera 800 until it is ready to receive such data. In this low-power mode, the WiFi radio unit 806 will sleep in a very low power state and only listen to every $n^{th}$ beacon (e.g., every $10^{th}$ beacon) from the AP 206. In one embodiment, this skip interval (e.g., every 10 beacons) is set by the host processor 802 before it enters sleep mode by initiating the HIBERNATE command to the microcontroller 804. In some embodiments, the WiFi radio unit 806 contains its own timer and will automatically wake up at predetermined times or intervals set by the host processor 804. Received beacons will include a time value sent by the AP 206 for purposes of synchronization.

When the WiFi radio unit 806 receives a beacon in which the TIM bit assigned to the node camera 800 is set, the host processor 802 is awakened to receive data and perform any necessary processing functions. In one embodiment, the microcontroller 804 receives the beacon data and determines whether the TIM bit assigned to the node camera 800 is set, and if so, wakes up the host processor 802, which will then bring the WiFi radio unit 806 up to full power to retrieve all the packets that are buffered by the AP 206. In one embodiment, the WiFi radio unit 806 will remain in this full power state for a defined timeout period (e.g., 200 ms) and then return to the low-power mode in which it only wakes up to listen for every $n^{th}$ beacon, as discussed above. Thus, the WiFi radio unit 806 automatically transitions from a full power mode to the low-power mode without any host intervention. Additionally, if the host processor 802 has packets for the WiFi radio unit 806 to transmit to the AP 206, the WiFi radio unit 806 will automatically transition to the higher power state, send the data, and then return to the low power state after the timeout period expires.

In one embodiment, after completion of boot up and initialization, the node camera 800 will attempt to be associated with an AP 206 and thereafter transition to the Idle state. The node camera 800 stores in memory 805 the service set identifier (SSID) of the last AP 206 it was associated with and attempts to associate again with this AP 206 when it attempts to associate with an AP 206. The host processor 802 sends this SSID information to the WiFi radio unit 806 to perform a Roam Scan, which will scan all available channels for that specific SSID. After a predetermined time the WiFi radio unit 806 will return with a result. If the AP 206 is not found after a predetermined amount of time or number of attempts, then the node camera 800 will perform a Failed Association routine, as described in further detail below.

If the camera 800 cannot associate with the AP 206 after a predetermined amount of time or number of attempts, it will perform a Failed Association process where it attempts to associate with an AP 206 with decreased frequency (i.e., longer time period between attempts) in order to conserve power, in accordance with one embodiment of the invention. In one embodiment, the Failed Association process increases the sleep time of the host processor 802 and the WiFi radio unit 806 after each failed association attempt by a predetermined amount of time (e.g., 2 to 3 seconds) plus a random amount of time (X) until it reaches a maximum sleep time ($N_{MAX}$), after which the node camera 800 wakes up at the end of every $N_{MAX}$ time interval to attempt association with an AP 206. The random value X is beneficial when there are a plurality of node cameras 800 in a network. For example, if the AP 206 loses power and comes back when all the cameras 800 are searching for beacons, all the cameras 800 may be on the same schedule and try to re-associate at the same time. This random time X spreads them out in time and helps prevent this scenario. In one embodiment, random value X is generated by a random number generator unit (not shown) within the host processor 802 that generates a number between 0 and 1 second, rounded to the nearest 10 milliseconds (ms).

Figure 9:
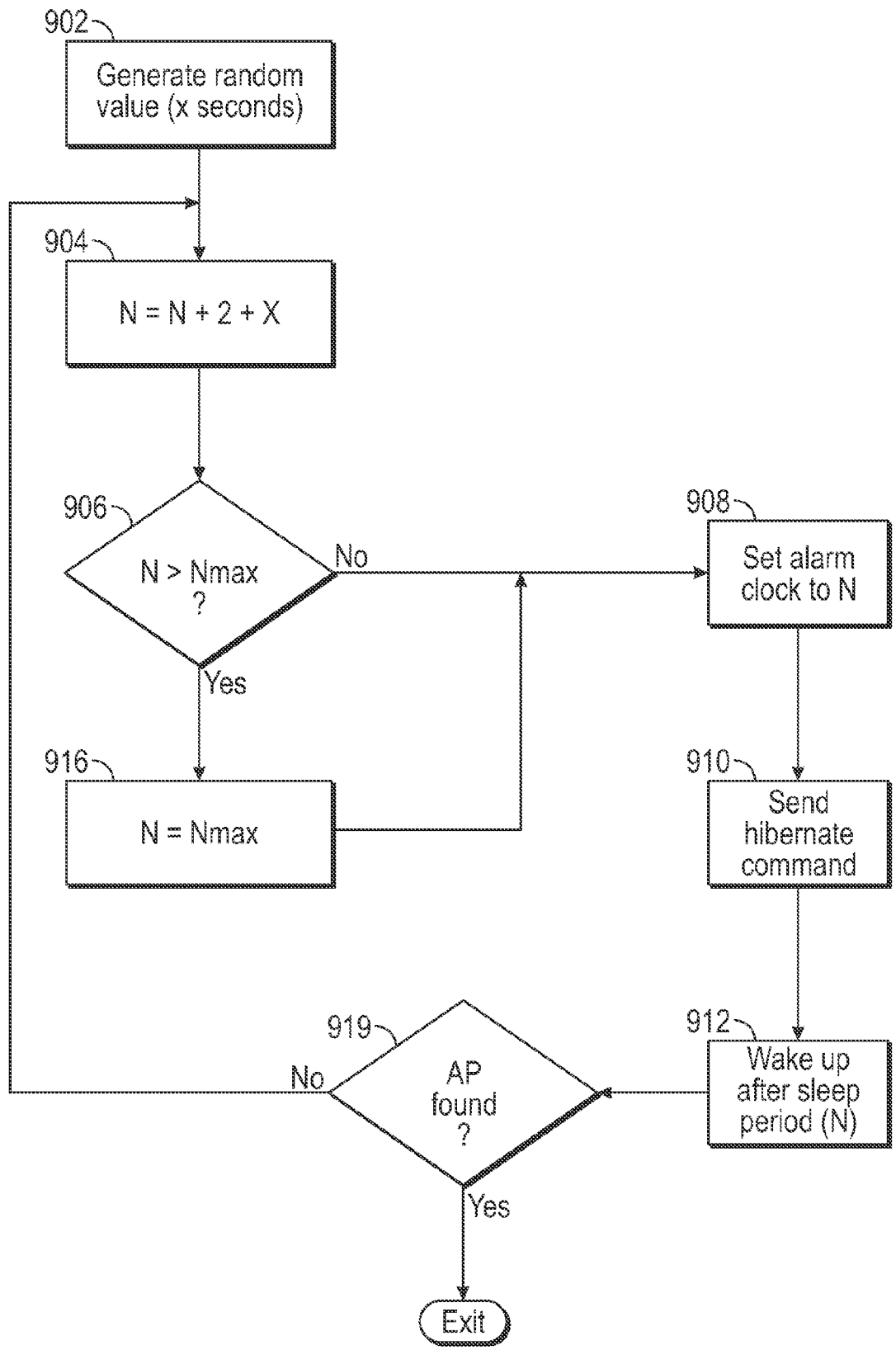
FIG. 9 shows a process flow chart of a method of associating a wireless node device with an access point, in accordance with one embodiment of the invention.

FIG. 9 illustrates a flow diagram of a process of increasing the sleep time of the host processor 802 and WiFi radio unit 806 during a Failed Association routine, in accordance with one embodiment of the invention. In one embodiment, the process of calculating increased sleep times as shown in FIG. 9 is performed by the host processor 802. At a first step 902, a random time value (X) is generated. Next, at step 904, the predetermined sleep time, which is initially set to a predetermined value (e.g., 0), is incremented by 2 seconds, for example, plus the random time value X. At step 906, it is determined whether N is greater than a maximum sleep period (e.g., 5 minutes). If the answer at step 906 is "No," then at step 908, the sleep time alarm clock is set to N.

Next, at step 910, the host processor 802 sends a HIBERNATE command to the microcontroller 804, at which point the microcontroller 804 will disable or decrease battery power to the host processor 802 and the WiFi radio unit 806 to place the node camera 800 in sleep mode. At step 912, at the expiration of sleep period N, the WiFi radio unit 806 is awakened to again attempt association with an AP 206. At step 914, the host processor is awakened to initiate another scan attempt to determine if an AP 206 has been found and associated with. If the answer is "Yes," then the process exits. If the answer is "No," the process returns to step 904 and resumes again from there. Returning to step 906, if it is determined that N is greater than $N_{MAX}$, then at step 916, N is set equal to $N_{MAX}$, and the process goes to step 908 and resumes from there, as discussed above.

As described above, when the node camera 800 cannot associate with an AP 206 after a predetermined amount of time or a predetermined number of tries, the node camera 800 will conserve battery power by decreasing the frequency of its attempts by slowly increasing sleep time intervals between attempts until a maximum sleep time (e.g., 5 minutes) is reached. Upon reaching the maximum sleep time, the node camera 800 will discontinue increasing its sleep time. In this way, the node camera 800 will continue to search for the AP 206 at reasonable interviews while not expending too much energy during the process.

Figure 10:
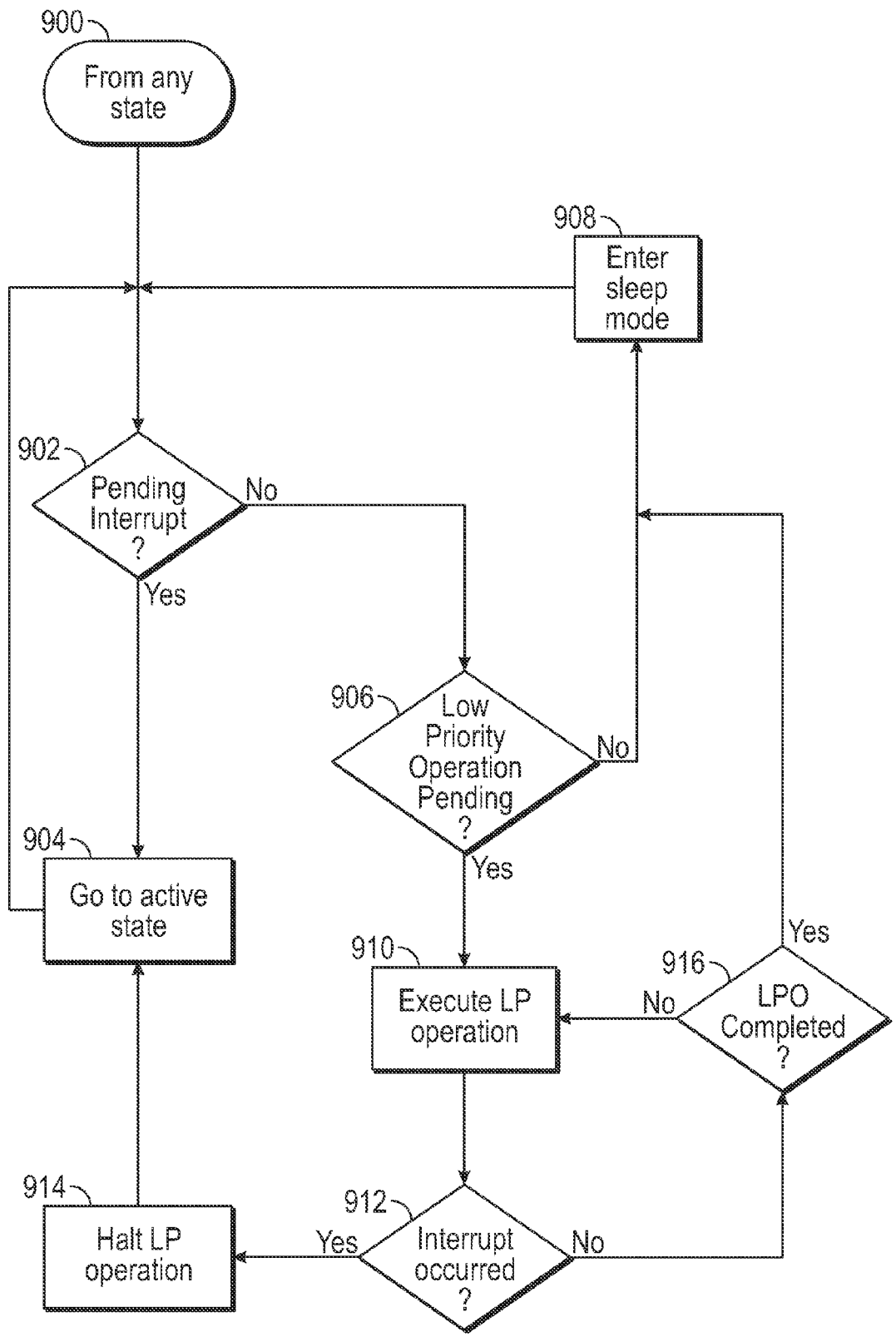
FIG. 10 illustrates a process flow chart of a secondary processor management process implemented by a wireless node camera, in accordance with one embodiment of the invention.

FIG. 10 illustrates a flowchart diagram of a management process implemented by microcontroller 804 of the node camera 800 to provide further system power conservation, in accordance with one embodiment of the invention. The process can begin from any state 900 (e.g., boot-up, idle, etc.) and then proceeds to step 902 in which it is determined whether there is a pending interrupt that requires the attention of the host processor 802. If "Yes," the process proceeds to step 904 in which the node camera 800 is transitioned from its current state (e.g., an Idle state) to an Active state, in which any pending Active state operations (e.g., receive/transmit signal to AP 206, process image data, etc.) are performed. After completion of all pending Active state operations, the process will go back to step 902.

If the answer at step 902 is "No," the process goes to step 906 where it is determined whether any low-priority operations (e.g., software/firmware debugging, etc.). If the answer is "No," the process moves to step 908 in which the node camera 800 is placed in a low-power sleep mode, which may or may not be the same as the Idle mode in various embodiments. It is understood that in various embodiments, the node camera 800 may have a plurality of low-power modes, each mode having different sets of units of the node camera 800 that are powered on and off depending on various states of the node camera 800.

If the answer at step 906 is "Yes," then at step 910, the process executes the pending low-priority ("LP") operation. During or after execution of the LP operation, at step 912, the process periodically checks whether an interrupt has occurred. If the answer at step 912 is "Yes," then the process goes to step 914 where the LP operation is halted and any information pertaining to a state of the low-priority operation is saved in a memory (e.g., memory 805 or memory within microcontroller 804). The process then proceeds to step 904 in which the node camera 800 is placed in an Active state to perform the pending operation(s) that caused generation of the interrupt, after which the process moves back to step 902 and resumes from there, as discussed above. If the answer at step 912 is "No," then at step 916, the process determines if the LP operation is completed. If not, then the process resumes at step 910 to complete execution of the LP operation and proceeds from there as discussed above. If the LP operation is completed, then the process moves to step 908 in which the node camera 800 enters a sleep mode and proceeds from there as discussed above.

As described above, in accordance with one embodiment of the invention, the microcontroller 804 functions as a low-power secondary processor for performing power management for the node camera 800. The host processor 802 and WiFi radio unit 806 are placed in a low-power sleep state only to be awakened when necessary by the microcontroller 804 to perform various operations. Additionally, the microcontroller 804 handles low-priority operations without waking the host processor 802, thereby saving power. In one embodiment, the microcontroller 804 requires less power during active state operation when compared with the host processor 802. If an interrupt occurs that requires the attention of the host processor 802, any pending or incomplete low-priority operations are suspended and their state information saved to give priority to Active state operations that require the attention of the host processor 802. As used herein, "low-priority operation" refers to any predetermined operation that may be handled by the microcontroller 806 or other secondary processor without intervention of the host processor 802. The term "active-state operation" refers to any predetermined operation that requires the host processor 802 to be awakened or active to perform at least part of the operation.

The term "unit" as used herein refers to known structures such as hardware, firmware, non-transitory computer-readable media that stores computer-executable instructions, or any combination of these elements, for performing the associated functions described herein. Additionally, various units can be discrete units; however, as would be apparent to one of ordinary skill in the art, two or more units may be combined to form a single unit that performs the associated functions according to various embodiments of the invention. Conversely, a single unit may be divided into two or more units that perform respective associated functions according to various embodiments of the invention.

"Instructions" as referred to herein relate to expressions which represent one or more logical operations. For example, instructions may be "machine-readable" by being interpretable by a machine for executing one or more operations on one or more data objects. However, this is merely an example of instructions and claimed subject matter is not limited in this respect. In another example, instructions as referred to herein may relate to encoded commands which are executable by a processing unit having a command set which includes the encoded commands Such an instruction may be encoded in the form of a machine language understood by the processing unit. Again, these are merely examples of an instruction and the invention is not limited in this respect.

As referred to herein the term "memory" refers to any type of long term, short term, volatile, nonvolatile, or other memory and is not to be limited to any particular type of memory or number of memories, or type of media upon which memory is stored. "Storage medium" as referred to herein relates to media capable of maintaining expressions which are perceivable by one or more machines. For example, a storage medium may comprise one or more storage devices for storing machine-readable instructions and/or information. Such storage devices may comprise any one of a number of media types including, for example, magnetic, optical or semiconductor storage media. Such storage devices may also comprise any type of long term, short term, volatile or non-volatile memory devices. However, these are merely examples of a storage medium, and the invention is not limited in these respects.

Additionally, one or more of the functions described in this document may be performed by means of computer program code or instructions that are stored in a "non-transitory computer-readable medium," which is used herein to generally refer to media such as memory storage devices. These, and other forms of computer-readable media, may be involved in storing one or more instructions for use by a processor to cause the processor to perform specified operations. By way of example, and not limitation, computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed and executed by a computer.

While various embodiments of the invention have been described herein, it is understood that the disclosed embodiments are provided by way of example only, and not by way of limitation. For example, various embodiments of the invention are described in the context of a battery-powered, wireless node camera and associated network. It is appreciated, however, that the invention may be implemented in many other types of devices, systems and networks that rely on battery power for supplying power to the device, system or network. Additionally, it should be understood that the various features and functionality described in connection with one or more of the individual embodiments are not limited in their applicability to the particular embodiment(s) with which they are described, but instead can be applied, alone or in some combination, to one or more of the other embodiments of the invention, whether or not such embodiments are explicitly described and whether or not such features are presented as being a part of a particular described embodiment. Thus, the claimed invention is not necessarily limited to the exemplary embodiments described herein but, rather, should be given the scope commensurate with the plain and ordinary meaning of the claims.

What is claimed is:

1. A wireless camera system, comprising:
a plurality of battery-powered, wireless node cameras, each node camera comprising an image sensor for capturing image data, a radio unit for performing wireless communications, at least one processing unit for controlling the image sensor and radio unit, and at least one battery; and
an access point configured to communicate wirelessly with each of the node cameras, and further configured to communicate with a control center that communicatively couples the access point to a computer network,
wherein the at least one processing unit in each node camera, comprises:
a host processing unit; and
a sleep mode unit coupled to the host processing unit and the radio unit configured to power down the host processing unit for a predetermined sleep time, wherein state information concerning a state of the host processing unit prior to being powered down is stored in a memory of a respective node camera, and if the radio unit does not receive a signal from the access point that associates the respective node camera with the access point after a predetermined number of attempts, the sleep mode unit increases the sleep time of the host processing unit after each set of one or more subsequent failed attempts by the respective node camera to associate with the access point, and wherein, upon being powered on, the host processor is configured to transition to the state it was in prior to being powered down.

2. The wireless camera system of claim 1, wherein the radio unit comprises a WiFi unit configured to provide two-way wireless communications in accordance with one or more 802.11 standards.

3. The wireless camera system of claim 1, wherein the sleep mode unit comprises a microcontroller.

4. The wireless camera system of claim 1, wherein the sleep mode unit further adds a random time (X) to the sleep time of the host processing unit and the radio unit.

5. The wireless camera system of claim 4, wherein the sleep mode unit increases the sleep time by a predetermined amount of time plus the random time after each set of the one or more subsequent failed attempts to the respective node camera to associate with the access point.

6. The wireless camera system of claim 1, wherein the sleep mode unit is configured to cease increasing the sleep time after a predetermined maximum sleep time is reached or exceeded.

7. The wireless camera system of claim 1, wherein the host processing unit and WiFi unit automatically enter a sleep mode after an association with the access point is established.

8. A battery-powered, wireless camera comprising:
an image sensor for capturing image data;
a radio unit for performing wireless communications with at least one external device;
at least one battery for supplying power to the wireless camera; and
at least one processing unit for controlling the radio unit, wherein the at least one processing unit, comprises:
a host processing unit; and
a sleep mode unit, coupled to the host processing unit and the radio unit, configured to power down the host processing unit for a predetermined sleep time, wherein state information concerning a state of the host processing unit prior to being powered down is stored in a memory of the wireless camera, and if the radio unit does not receive a signal from the access point that associates the wireless camera with the access point after a predetermined number of attempts, the sleep mode unit increases the sleep time of the host processing unit after each set of one or more subsequent failed attempts by the wireless camera to associate with the access point, and wherein, upon being powered on, the host processor is configured to transition to the state it was in prior to being powered down.

9. The wireless camera of claim 8, wherein the radio unit comprises a WiFi unit configured to provide two-way wireless communications in accordance with one or more 802.11 standards.

10. The wireless camera of claim 8, wherein the sleep mode unit comprises a microcontroller.

11. The wireless camera of claim 8, wherein the sleep mode unit further adds a random time (X) to the sleep time of the host processing unit and the radio unit.

12. The wireless camera of claim 11, wherein the sleep mode unit increases the sleep time by a predetermined amount of time plus the random time after each set of the one or more failed attempts of the respective node camera to associate with the access point.

13. The wireless camera of claim 8, wherein the sleep mode unit is configured to cease increasing the sleep time after a predetermined maximum sleep time is reached or exceeded.

14. The wireless camera of claim 8, wherein the host processing unit and radio unit automatically enter a sleep mode after an association with the access point is established.

15. A wireless communication device, comprising:
a radio unit configured to provide two-way wireless communications;
a host processing unit; and
a sleep mode unit, coupled to the host processing unit and the radio unit, configured to power down the host processing unit for a predetermined sleep time, wherein state information concerning a state of the host processing unit prior to being powered down is stored in a memory of the wireless communication device, and if the radio unit does not receive a signal from the access point that associates the wireless communication device with the access point, the sleep mode unit increases the sleep time of the host processing unit and the radio unit after each set of one or more failed attempts by the wireless communication device to associate with the access point, and wherein, upon being powered on, the host processor is configured to transition to the state it was in prior to being powered down.

16. The wireless communication device of claim 15, wherein the radio unit comprises a WiFi unit configured to provide two-way wireless communications in accordance with one or more 802.11 standards.

17. The wireless communication device of claim 15, wherein the sleep mode unit comprises a microcontroller.

18. The wireless communication device of claim 15, wherein the sleep mode unit further adds a random time (X) to the sleep time of the host processing unit and the radio unit.

19. The wireless communication device of claim 18, wherein the sleep mode unit increases the sleep time by a predetermined amount of time plus the random time after each set of the one or more failed attempts of the wireless communication device to associate with the access point.

20. The wireless communication device of claim 15, wherein the sleep mode unit is configured to cease increasing the sleep time after a predetermined maximum sleep time is reached or exceeded.

21. The wireless communication device of claim 15, wherein the host processing unit and radio unit automatically enter a sleep mode after an association with the access point is established.

22. A method for associating a wireless communication device with an access point, comprising:
powering down a host processing unit of the wireless communication device for a predetermined sleep time and storing a state of the host processing unit prior to powering down of the host processing unit;
if the wireless communication device does not receive a signal from the access point that associates the wireless communication device with the access point after a predetermined number of attempts, increasing a sleep time of the wireless communication device after each set of one or more subsequent failed attempts by the wireless communication device to associate with the access point; and
upon powering on the host processing unit, transitioning the host processing unit to the state it was in prior to being powered down.

23. The method of claim 22, wherein the wireless communication device is configured to provide two-way wireless communications in accordance with one or more 802.11 standards.

24. The method of claim 22, further comprising adding a random time (X) to the sleep time of the wireless communication device.

25. The method of claim 24, wherein the sleep time is increased by a predetermined amount of time plus the random time after each set of the one or more subsequent failed attempts of the wireless communication device to associate with the access point.

26. The method of claim 22 further comprising ceasing to increase the sleep time after a predetermined maximum sleep time is reached or exceeded.

27. The method of claim 22 further comprising the wireless communication device automatically entering a reduced power state after an association with the access point is established.

* * * * *